United States Patent [19]
Armstrong

[11] 4,354,745
[45] Oct. 19, 1982

[54] SLIDE HANDLING APPARATUS

[76] Inventor: Raymond E. Armstrong, 12 Relmar Rd., Toronto, Ontario, Canada, M5P 2Y5

[21] Appl. No.: 186,097

[22] Filed: Sep. 11, 1980

Related U.S. Application Data

[63] Continuation-in-part of Ser. No. 138,770, Apr. 10, 1980, abandoned, which is a continuation-in-part of Ser. No. 1,510, Jan. 8, 1979, abandoned.

[30] Foreign Application Priority Data

Jan. 3, 1980 [EP] European Pat. Off. ........ 80300011.6

[51] Int. Cl.³ ............................................. G03B 23/02
[52] U.S. Cl. .................................. 353/112; 353/122; 414/404
[58] Field of Search ................ 414/404; 353/103, 111, 353/112, 113, 117, 122

[56] References Cited

U.S. PATENT DOCUMENTS

2,922,335 1/1960 Lacoe .................................. 353/112
3,781,103 12/1973 Di Pietro ........................... 353/111

Primary Examiner—John W. Shepperd
Attorney, Agent, or Firm—Rogers, Bereskin & Parr

[57] ABSTRACT

Apparatus for handling photographic slides is disclosed. According to one aspect of the invention, the apparatus is adapted to support two rotary slide trays disposed one above the other. Means is provided for indexing the lower tray and a coupling member extends between the two trays so that the upper tray is indexed in synchronism with the lower tray. A chute is provided for conveying slides from the upper tray to the lower tray and is shaped to turn the slides laterally so that they enter the second tray in reverse orientation compared with their former orientation in the first tray. Slide loading and unloading devices for use with the apparatus are also disclosed. According to another aspect of the invention, the apparatus is adapted to load stacked slides into a rotary slide tray.

16 Claims, 12 Drawing Figures

SLIDE HANDLING APPARATUS

This application is a continuation-in-part of application Ser. No. 138,770 filed Apr. 10, 1980 now abandoned, which is itself a continuation-in-part of application Ser. No. 1,510 filed Jan. 8, 1979 (now abandoned).

This invention relates to an apparatus for handling photographic slides.

The invention has been devised primarily in connection with the field of audiovisual arts. In that field, it is common to use both front-screen and rear-screen projection techniques for showing photographic slides. Thus, depending on the particular program being shown, it might be convenient to use rear-screen projection in one particular situation and to use front-screen projection in another. This poses the problem that slides which are correctly oriented for projection in either of these modes must be reversed for proper projection in the other modes must be reversed for proper projection in the other mode. For example, if a particular sequence of slides has been loaded into a projection tray correctly oriented for rear-screen projection and those slides are subsequently required to be projected in the front-screen mode, each slide must be individually reversed in the tray. Conventionally, this is done by individually turning the slides by hand. However, this is a tedious and time consuming operation which brings with it the risk that the slides may be improperly re-oriented or damaged in some way during handling, e.g. by being dropped or marked by fingerprints.

An object of the present invention is to provide a slide handling apparatus which is capable of automatically reversing slides. A further aim is to provide an apparatus for loading slides into slide trays.

According to one aspect of the invention the apparatus includes means adapted to support a rotary slide tray for turning about a generally upright axis, and means for indexing the tray about said axis. Means is also provided for coupling a second similar tray with the indexing means so that the second tray is indexed in synchronism with the first tray in use, the second tray being disposed in a position above and coaxially with the first mentioned tray. Each tray includes a rotatable tray portion defining a plurality of slide receiving compartments arranged in an annular configuration and having open upper and lower ends. A stationary base member normally closes the lower ends of the compartments and has an opening through which slides can successively leave the compartments at a discharge position as the tray portion rotates in use. Means is also provided for maintaining the base member of the second tray stationary while the associated tray portion is indexed by the coupling means. Further, the apparatus includes chute means disposed between the two trays and having an upper end disposed adjacent the discharge position for the second tray for receiving slides leaving the second tray, and a lower end arranged to deliver such slides into the first tray. The chute means defines a track down which the slides travel by gravity and which is shaped to turn each slide laterally in travelling along said track to an extent such that the slides enter the first tray in reverse orientation compared with their formed orientation in the second tray. The indexing means is operable to index both trays through angular amounts sufficient to bring successive compartments of the first tray to a position below the lower end of the chute.

According to a second aspect of the invention there is provided a slide handling apparatus which includes a body defining a support surface for a slide tray having a plurality of slide receiving compartments arranged in a series and means for indexing the tray to bring the compartments successively to a predetermined position for loading of slides into the compartments. The indexing means includes a rotary drive element adapted to be engaged by the tray so that the tray can be indexed by turning the element, and motor drive means adapted to turn the element through predetermined angular increments to index the tray. A slide magazine is provided for receiving a stack of slides to be loaded into the tray, the magazine having a slide outlet at the bottom of said stack. Means is provided supporting the magazine above the tray. Guide means is provided below the magazine slide outlet and is adapted to receive successive slides from the magazine and deliver them in proper orientation into the tray. Gate means is also provided for controlling the magazine slide outlet and is adapted to release successive slides from the bottom of a stack in the magazine in a timed relation with indexing of the first tray selected so that the slides travel from the magazine and into successive compartments in the tray as the tray is indexed. The gate means includes a gate member disposed adjacent the magazine slide outlet and movable between a normal rest position in which the member retains a stack of slides in the magazine, and a release position in which the member momentarily releases the lowermost slide in the stack to the guide means and returns to its rest position to restrain the next slide in the stack. The gate means also includes drive means releasably coupling the gate member with the indexing means and adapted to move the gate member to its said release position and back to its rest position each time the drive shaft is indexed.

In order that the invention may be more clearly understood, reference will now be made to the accompanying drawings which illustrate a number of preferred embodiments of the invention by way of example, and in which.

Figure 1:
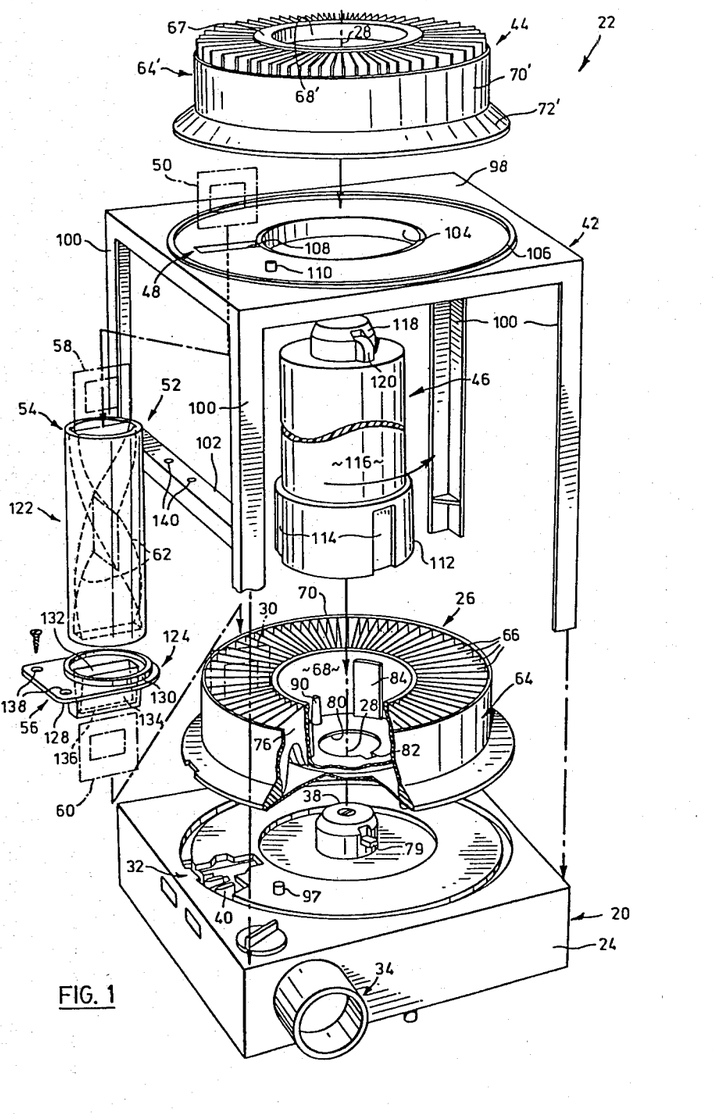
FIG. 1 is an exploded perspective view of a slide handling apparatus according to a first embodiment of the invention, in which a conventional slide projector is used as the tray indexing means.

Referring first to FIG. 1, the apparatus comprises a conventional slide projector generally indicated at 20, and an associated slide reversing device shown in an exploded position at 22. Typically, projector 20 may be of the type sold by Kodak under the trade mark EKTAGRAPHIC. In any event, the projector includes a body 24 adapted to support a slide tray 26 for rotation about a generally vertical axis 28. Tray 26 is a conventional "carousel" type slide tray of annular shape and is designed to support a plurality of slides generally in spaced vertical planes disposed radially about axis 28. One such slide is indicated at 30.

Projector 20 also includes a projection gate generally indicated at 32 into which slides drop from tray 26 for projection in known fashion. The projector also has a conventional optical system for illuminating and projecting slides in the gate. Part of this system includes a projection lens assembly denoted 34.

The projector includes a mechanism for indexing the tray about axis 28 to bring successive slides into a position in which they can drop into gate 32 for projection. For present purposes it is sufficient to note that this mechanism includes a short, generally cylindrical boss 38 which projects upwardly from the projector body for locating slide tray 26 with respect to axis 28, and a driving element 40 which is located in gate 32 and which engages the underside of tray 26 as will be described. Each time the projector is operated, element 40 moves laterally abot axis 28 and advances tray 26 through a discrete angular amount.

The slide reversing device 22 includes a support 42 on which is disposed a second slide tray 44 essentially identical with tray 26. Tray 44 is supported so that it too is rotatable about axis 28. A coupling member is indicated at 46 and is designed to couple the second tray 44 with the indexing mechanism of the projector so that tray 44 is indexed in synchronism with the first tray 26 when the projector is in use. As will be described, tray 44 has a stationary base member which provides an opening through which successive slides can drop out of the tray by gravity at a predetermined discharge location as the tray rotates in use. In FIG. 1, the discharge location is indicated generally by reference numeral 48 and a slide leaving the tray is indicated at 50.

Device 22 also includes a chute 52 which is carried by support 42 and which has an upper end 54 disposed to receive each successive slide leaving the second tray 44, and a lower end 56 arranged to deliver the slides into the first tray 26. A slide entering chute 52 is indicated at 58 and another slide leaving the chute is shown at 60. Chute 52 defines an internal track represented by two grooves 62 arranged to receive respectively opposite side edges of a slide entering the chute. The grooves 62 are shaped to turn each slide laterally as it travels the length of the track to an extent such that the slides enter the first tray 26 in reverse orientation compared with their former orientation in the second tray 44. It will be seen that, in this particulr embodiment, the grooves 62 are of helical form and are arranged so that each slide is laterally reversed face for face in travelling down the chute. Thus, the slides enter the tray 26 on projector 20 in positions in which they are reversed compared with their former positions in the upper tray 44.

Having generally described the principal components of the slide reversing device, the device will now be described in more detail with reference to FIG. 1 and 2.

Figure 3:
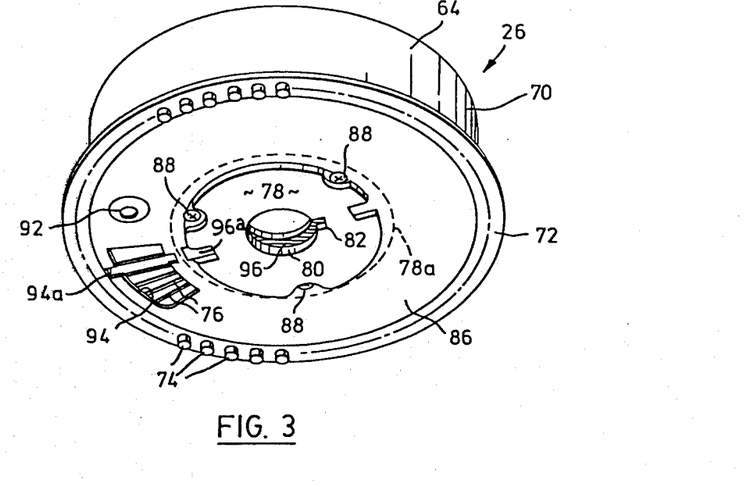
FIG. 3 is an underneath perspective view of one of the slide trays shown in the previous views.

However, it may be helpful initially to refer to FIG. 3. which is an underneath perspective view of slide tray 26. Tray 44 is essentially the same and primed reference numerals have been used to denote corresponding parts of tray 44. Tray 26 includes a tray portion 64 which is a one-piece plastic moulding and which defines, at its upper side (see FIG. 1) an annular series of slide-receiving slots or compartments 66 which are open at their upper and lower ends. Tray 44 is shown fitted with a conventional slide retaining ring 67 which prevents the slides being dislodged upwardly out of compartments 66. This ring has been removed from tray 46 to allow slides to enter the tray. In any event, portion 64 of tray 26 includes upright inner and outer walls 68 and 70 respectively of circular shape which define said series of compartments. A flange 72 projects outwardly from the outer wall 70 around its lower edge and has a series of downwardly projecting pins 74 around its lower surface (see FIG. 3). These pins are engaged by the driving element 40 of the projector indexing mechanism for turning tray 26 when the projector is in use.

Referring back to FIG. 1, the compartments 66 are defined by a plurality of radially extending partitions 76 disposed between the inner and outer walls 68 and 70. A bottom wall 78 of annular shape is provided at the bottom of the inner wall 68 and is integral therewith. Wall 78 is formed with a central opening 80 for receiving the boss 38 on top of the projector. Opening 80 includes a notch 82 which provides clearance for a tongue 79 on boss 38. Tongue 79 assists in holding the tray on the projector in known manner.

A generally rectangular shaped projection 84 is provided on the inner wall 68 and extends generally parallel to axis 28. This projection exists on the tray as manufactured and provides a convenient key for co-operation with the coupling member 46 as will be described. Two other projections similar to projection 84 are provided on wall 68 but are not visible in FIG. 1. The three projections are substantially equally spaced from one another.

Referring back to FIG. 3, tray 26 also includes a base member in the form of a thin metal plate 86 of annular shape. Plate 86 is disposed between the flange 72 and the bottom wall 78 of the upper part and closes the open lower ends of the compartments 66 of the tray. Plate 86 is freely turnable with respect to the tray portion 64 of the tray and is held in place by three screws, the heads of which are visible at 88 in FIG. 3. Thus, the screws extend upwardly into moulded housings on wall 78 (one of which is indicated at 90 in FIG. 1). The heads 88 overlap the inner edge of plate 86 as seen in FIG. 3 so that the plate is trapped below but can slide with respect to the tray portion 64 of the tray. Plate 86 includes a countersunk opening 92 by which the plate can be held against turning in use, and an opening 94 which includes a slot portion 94a dimensioned to allow slides to fall through the slot when tray portion 64 is indexed in use. Thus, it will be appreciated that if plate 86 is restrained against turning while the upper part 64 of the tray is indexed by the projector, the lower ends of the compartment 66 will be successively exposed so that, in each case, a slide can drop out of the compartment. The projector indexing mechanism engages the pins 74 on tray portion 64 and is designed to index portion 64 by incremental amounts corresponding to the spacing between two compartments 66 each time the projector is operated.

In FIG. 3, part of a spring clip is visible at 96 through the opening 80 (but is not shown in FIG. 1). This clip is conventional in such trays and serves to lock the base plate 86 with respect to the tray portion 64 in the "zero" position of the tray. Thus, the slide receiving compartments are usually numbered beginning with "0" and this compartment is not used; in fact, it is usually blocked by a plastic "pip" which prevents slides entering the compartment. When the slot portion 94a of opening 94 is below this "0" compartment a tongue 96a of group 96 springs into a notch in plate 86. At this time, the spring clip is displaced somewhat from the centre of the tray so that the central opening in the clip is no longer aligned with the opening 80 in the bottom wall 78 of the tray. When the tray is fitted to a projector, the boss on which the tray fits projects through the clip and forces it to realign with opening 80 so that its tongue 96a is withdrawn and the base plate and tray portion are no longer locked together.

Referring back to FIG. 1, tray 26 is shown in an exploded position above the top of projector 20. When they tray is fitted to the projector, boss 38 engages in the opening 80 in the tray and driving element 40 engages the appropriate one of the pins 74. The metal plate 86 at the bottom of tray 26 is held against rotation by a pin 97 which is disposed adjacent the projector gate 36 and which engages in the opening 92 in plate 86. Thus, as the projector indexing mechanism is operated, only the tray portion 64 of tray 26 turns. As each compartment 66 arrives at the position of the slot portion 94a in the opening 94 in base plate 86, the slide in that compartment drops down into the projector gate 32 for projection. Next time the projector is operated, that slide is returned to tray 26 by the internal mechanism of the projector (not shown), the tray is advanced and the next slide drops into the projector gate.

Support 42 includes a platform 98 and four legs 100 which depend from platform 98 and are adapted to support the platform in a generally horizontal position above the projector. In this particular embodiment, the legs 100 are designed so that their lower ends can be fitted onto the corners of the projector body 24 so that the support will in effect stand on the projector body. This has the advantage that platform 98 will always remain parallel with the top of the projector body and will tilt with the projector in the event that its attitude is adjusted for proper projection. However, in another embodiment, the legs 100 could be disposed outside the confines of the projector body for resting directly on the support surface. In that event, it might be necessary to provide means for adjusting the attitude of a support to conform with the attitude of the projector itself.

In any event, the support also includes a cross member 102 which extends between two of the legs 100 and which provides a mounting for the chute 52. In this case, the support comprising platform 98, legs 100 and cross member 102 is a one-piece plastic moulding altough there is of course no limitation in this regard.

Platform 98 has a circular central opening 104 of a size corresponding generally to the diameter of the opening in the top of tray 44. Extending around and spaced outwardly from opening 104 is an upstanding circular rib 106. The diameter of rib 106 is slightly less than the diameter of the series of projections 74' which project from the underside of tray 44. Thus, the projection 74' and rib 106 provide for some measure of lateral location of the tray.

Platform 98 also includes a rectangular opening 108 which extends generally radially of opening 104 and is located between that opening and rib 106. Opening 108 is dimensioned and positioned so that a slide which is allowed to drop out of tray 44 can pass through the opening and into chute 52. A pin 110 projects upwardly from platform 98 adjacent opening 108 and is positioned for engagement in the opening 92' in the metal plate 86' at the bottom of tray 44. Thus, tray 44 wil be placed on platform 98 such that pin 110 will enter opening 92' and restrain plate 86' from turning generally in the manner discussed above in describing tray 26. Portion 64' of tray 44 is coupled to the indexing mechanism of the projector by the coupling member 46 so that it can be indexed about axis 28 in use to bring successive slides into register with the opening 94' in the bottom plate 86' of the tray. Each successive slide will then drop down through the opening 108 in platform 98 and into the chute 52.

Coupling member 46 is a one-piece hollow plastic moulding of generally cylindrical shape having a lower end portion 112 shaped to fit inside the inner wall 68 of the bottom tray 26. Portion 112 is formed with circumferential recesses 114 positioned to correspond with the positions of the projections 84 in tray 26 so that member 46 can in effect be keyed to the tray by inserting its lower end portion 112 into the central opening in tray 26. Openings 115 accommodate the screw housings 90 (FIG. 2) of tray 26. Accordingly, member 46 will be indexed with tray 26 when the projector is operated.

Member 46 includes a centre section 116 which is of somewhat smaller diameter than the bottom section 112. At its upper end, the member includes a generally cylindrical drive projection 118 which is essentially of the same shape as the boss 38 on the projector and which engages in opening 80' in tray 44. A tongue 120 projects generally radially from driving projection 118 but, in contrast to tongue 79 of boss 38, engages in the notch 82' associated with opening 80' so as to key projection 118 to portion 64' of tray 44.

Figure 2:
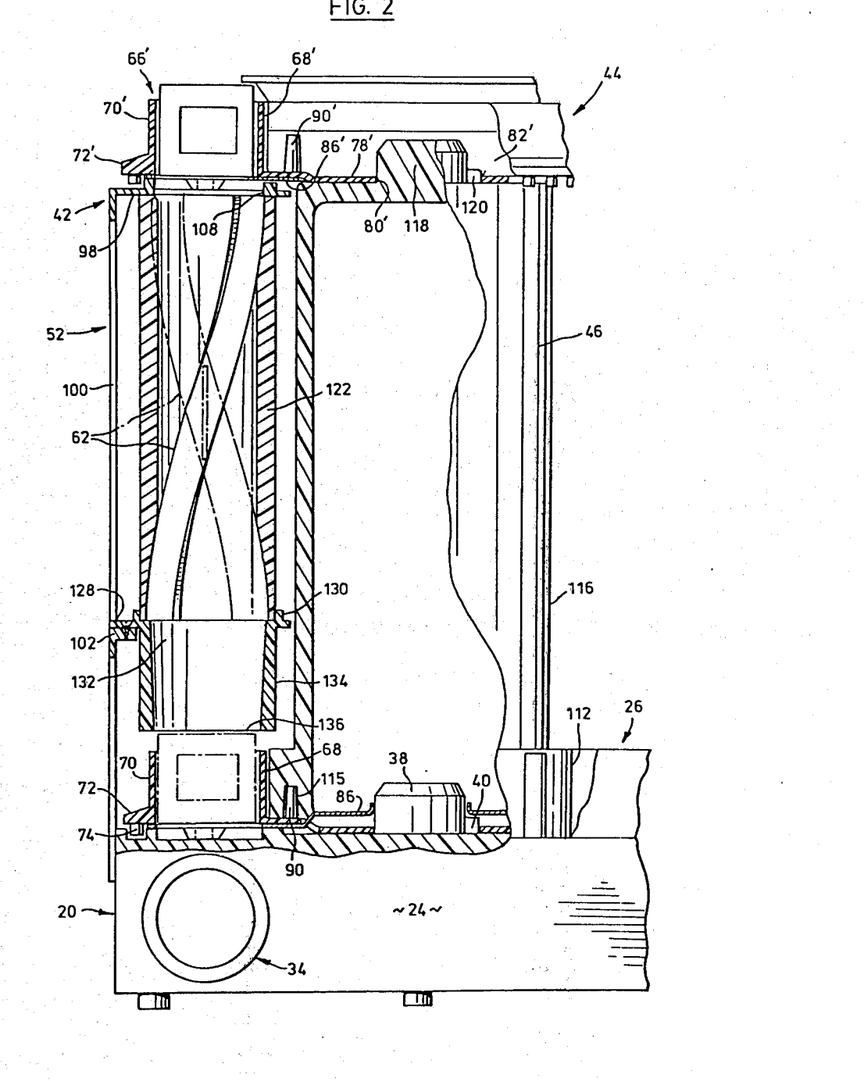
FIG. 2 is a vertical sectional view corresponding to FIG. 1, with the device shown in position on the projector.

As can best be seen in FIG. 2, member 46 is of a length such that, when its lower end is fitted to tray 26, the top face of its centre section 116 is disposed just above the top surface of platform 98 with driving projection 120 protruding above the platform. In this position, tray 44 can be placed over and engaged with the driving projection 118. Tray 44 is thus supported substantially entirely by member 46.

It will be appreciated from the foregoing that, when the slide reversing device is assembled on the projector as shown in FIG. 2, the second tray 44 will be indexed in synchronism with the first tray 26 when the projector is operated. Thus, the upper portion 64' of tray 44 will be turned each time the projector is operated, by an amount corresponding to the angular spacing between an adjacent pair of compartments 66' in tray 44. This will bring successive ones of the slides in tray 44 into register with the slot in the base plate 86' of the tray.

As mentioned previously, chute 52 is disposed with its upper end 54 in a position to receive the slides which drop from tray 44. In this particular embodiment, chute 52 includes a body portion 122 of hollow cylindrical shape and an outlet portion 124 at the bottom of body portion 122. Body portion 122 is formed with the grooves discussed above which define the track down which the slides travel. Outlet portion 124 includes a mounting plate 128 having on its upper surface an annular flange 130 which receives the lower end of body portion 122. In this particular embodiment, the two portions 122 and 128 of chute 52 are plastic mouldings and are secured together using a suitable adhesive. Within flange 130, plate 128 is formed with a slot 132 which is of a size such that a slide can readily pass through the slot, and which is aligned with the lower end of the track represented by the groove 62 in body portion 122. Slot 132 is of a depth substantially greater than the thickness of plate 128 and extends into a funnel shaped element 134 below plate 128. The slot tapers inwardly from side to side to a relatively narrow end opening 136 which is of a size only slightly larger than a slide so that a slide can pass freely through the opening, but at the same time is stabilized by the relatively close proximity of the walls of portion 128 defining opening 136. Thus, in practice, the tapered slot or funnel 132 acts to decelerate the slides and prevent any tendency they may have to spin as they leave the track in body portion 122. This has been found to promote smooth movement of slides out of chute 52 while avoiding problems due to jambing of slides in the chute.

It will be noted that plate 128 is formed with two openings 138 for receiving screws. These openings align with corresponding openings 140 in the cross member 102 of support 42. Thus, plate 128 provides a mounting for the chute 52 and, in the assembled device, is secured to cross member 102. The chute is positioned so that the opening 136 at its lower end 56 aligns with one of the compartments 66 in tray 26 when the tray is stationary. This ensures smooth movement of slides from chute 52 into tray 26. In this particular embodiment, the point at which slides enter tray 26 from chute 52 will be slightly in advance of the position at which the slides move from tray 26 into the projection gate 32. In other words, the slides will enter tray 26 from chute 52 but will not drop into the projection gate 32 until tray 26 has been advanced to the discharge position at which the slides drop into the gate. However, it is to be understood that, in an alternative embodiment, the slides could drop into tray 26 at a position such that they would probably necessitate a modification to the internal mechanism of the projector to accommodate the time delay which would be occasioned by the fact that the slides would have to travel from the upper tray 44 and down the chute 52 before they would be ready to enter the projection gate.

Briefly, the operation of the slide reversing device as described so far will be as follows:

First, an empty slide tray (as tray 26) will be fitted to the projector 20. Coupling member 46 will not, of course, be in place at this time. The empty tray may be manoeuvred between the legs 100 of support 42 or the support may be lifted off the projector to facilitate this operation. In any event, when tray 26 is in place, member 46 will be inserted into the opening at the centre of tray 26 and, in effect, keyed to the tray. If the support 42 was previously removed, it will then be replaced and the tray of slides to be reversed (as tray 44) will be placed on the support and fitted to the driving projection 118 at the top of coupling member 46. Tray 44 may, for example, have previously been used for rear-screen projection and the slides in that tray would, accordingly, be disposed in reverse orientation compared with the required orientation for front screen projection.

When the projector 20 is operated, both of the trays 26 and 44 will be turned through the same angular amount corresponding to the angular spacing between two adjacent ones of the compartments in the trays. As soon as the slide in tray 44 reaches the position of the slot in the base plate of that tray, the slide will fall out of the tray (as slide 50) and enter chute 52. The slide will travel through chute 52 with its side margins in their respective grooves 62 so that the slide will be turned laterally face for face by the time it emerges from the lower end of the chute. From the chute, the slide will enter the appropriate one of the empty compartments 66 in tray 26. The next time the projector is operated, both trays will again advance by one angular increment and the next slide from tray 44 will pass into the corresponding compartment 66 in tray 26, being reversed in chute 52 in passing from the upper to the lower tray. When the first slide in tray 26 reaches the position of gate 32, the slide will drop into the projection gate for viewing. The next time the projector is operated, that slide will be returned to tray 26 by the internal mechanism of the projector and the two trays will be advanced again to cause the next succeeding slide to enter gate 32. At the same time, another slide will travel down from tray 44 into tray 26. This will continue until all of the slides in tray 44 which are required to be projected have been reversed and passed through the projection gate.

It will of course be appreciated that it is not essential that the slides be actually projected in projector 20. If the projector lamp is switched off, the reversing device and projector may be used simply for reversing slides without actually causing them to be projected onto a screen.

In another embodiment, support 42 could be of different design; for example, it could be designed to be hinged to the projector so that it could be tilted back to facilitate fitting of the lower slide tray to and removal thereof from the projector. The coupling member may in that event be designed to tilt with the support at this time.

The coupling member 46 need not be of the particular form shown. In the preceding embodiment, member 46 is designed to support most of the weight of tray 44. However, this is not essential. In another embodiment, the weight of the tray could be taken on platform 98 and a somewhat lighter coupling member could be employed. Where the coupling member is also used as a support, the structure shown at 42 in the drawings could even be omitted provided means is provided for restraining the base member of tray 44 against rotation. This could be achieved, for example, using a separate structure extending upwardly from the projector body or by a suitable fitment on chute 52. In that event, the chute could be mounted directly on the projector body.

Further, although the slide reversing device has been described in association with a particular projector, it should be noted that the device may be used with any projector of the "carousel" type. Also, while the device has been described as an attachment for a conventional projector it could of course be incorporated in an especially manufactured projector having a slide reversing facility.

FIGS. 4 to 13 illustrate a still further embodiment in which a slide reversing apparatus is constructed as self-contained unit having built in tray indexing means.

Figure 4:
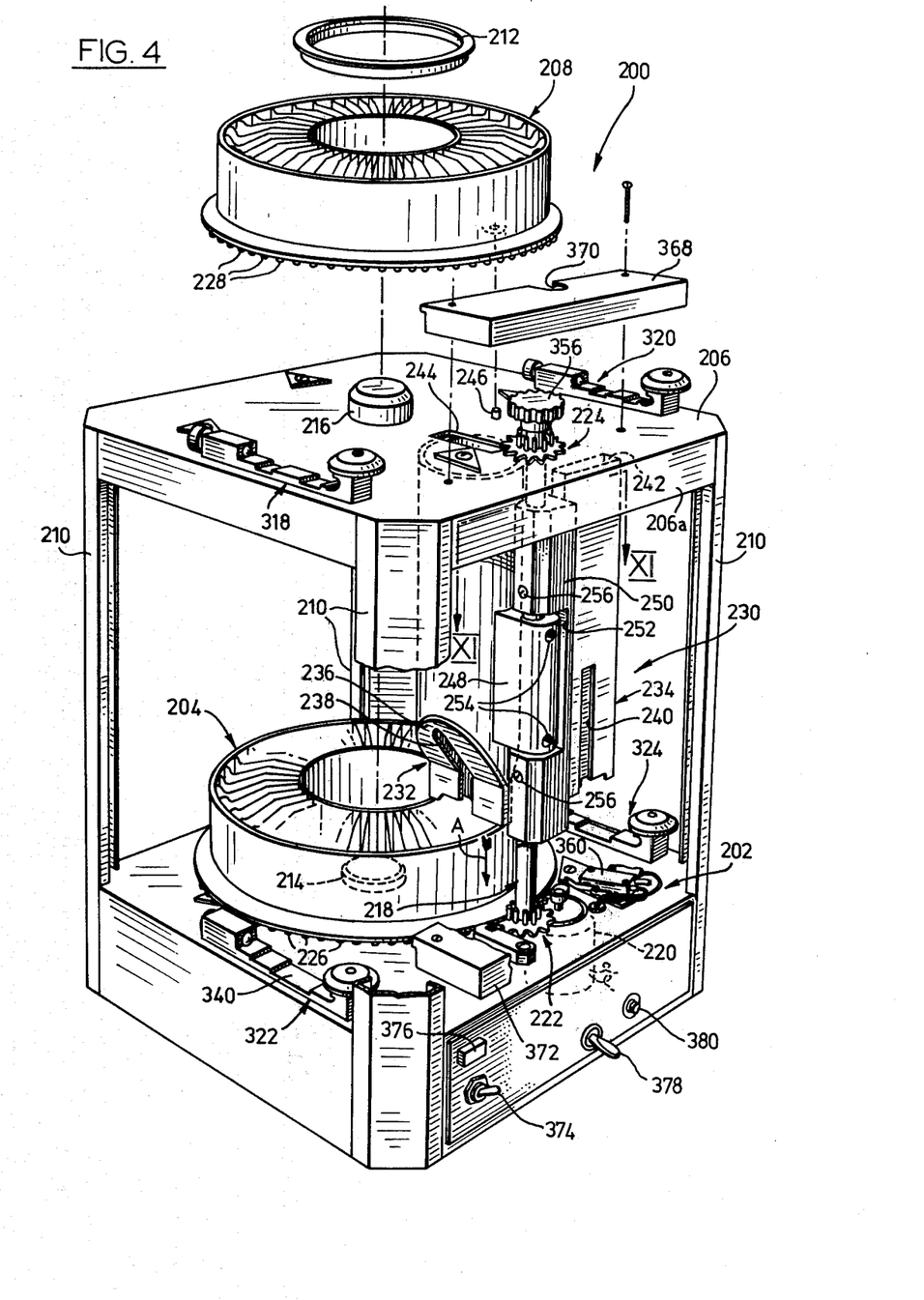
FIG. 4 is a partly exploded perspective view of a slide handling apparatus according to a second embodiment of the invention, having built-in tray indexing means.

Referring first to FIG. 4, the unit is generally indicated at 200 and includes a body 202 having a flat upper surface for supporting a lower slide tray 204, and a platform 206 for rotably supporting a second similar slide tray 208 and which is itself supported from body 202 by four rigid legs 210. The trays 204 and 208 are the same as the trays 26 and 44 respectively of the first embodiment. A slide retaining ring is shown in exploded position above tray 208 at 212 and the corresponding ring of tray 204 has been removed. The trays are located for rotation by respective bosses 214 and 216 each of which engages in the central opening of the relevant tray. A coupling member in the form of a shaft 218 extends vertically between body 202 and platform 206 and is rotatably supported by bearings (not shown) adjacent at upper and lower end. The body 202 of the apparatus also serves as a housing for an electric drive motor indicated at 220. The motor intermitently drives shaft 218 in rotation as will be more specifically described later with reference to FIGS. 9 and 10. The shaft in turn drives the trays 204 and 208 intermittently by respective gear wheels 222 and 224 which are attached to shaft 218 and are positioned to engage the pins which depend from the underside of each slide tray. These pins were denoted 74 in connection with the preceding embodiment (see FIG. 3) and are visible at 226 and 228 in association with the respective trays in FIG. 4. It will be appreciated that, by positioning the coupling member 218 to one side of the trays, insertion and removal of the trays is greatly facilitated compared with the previous embodiment in that both trays can be simply lifted off the respective bosses and withdrawn laterally without having to remove the coupling member. The platform support legs 210 are spaced by an amount sufficient to provide clearance for the lower tray to readily pass therebetween at this time.

Shaft 218 also supports a chute assembly generally dedenoted 230. The chute assembly includes two chutes denoted respectively 232 and 234. Chute 232 is generally similar to chute 52 described in connection with the first embodiment in that it is designed to reverse face for face slides travelling down the chute. Chute 234 on the other hand is a "straight-through" chute down which the slides can pass without being reversed. The purpose of this chute will become apparent later. Chute 232 has two spiral shaped internal tracks (not shown) similar to the tracks 62 shown in FIG. 1 and which receive respectively opposite edges of a slide passing through the chute. The chute has a funnel shaped portion 236 at its lower end which is similar to the funnel shaped element 134 of chute 52. An upright slot 238 is provided in the side of this portion to allow access to the interior of the portion in the unlikely event that a slide should become jammed therein. A similar slot 240 is provided in chute 234. It will be seen that this chute simply defines a straight and continuous longitudinal slot of a rectangular cross sectional shape slightly greater than that of the slides themselves. The top end of the slot is visible at 242.

The two chutes 232 and 234 are turnably coupled to shaft 218 so that each chute can be swung back between an inoperative position clear of the lower tray 204, and an operative position in which the chute is disposed directly above tray 204 and below the discharge location of the upper tray. This location is represented by a slot 244 in platform 206. A pin is shown at 246 on platform 206 for locating the base member of the tray (86 in FIG. 3) with respect to the slot as discussed previously primarily in connection with FIG. 3. In any event, in FIG. 4, chute 232 is shown in its operative position below slot 244 while chute 234 is shown in its inoperative position. Latch mechanisms for securing the chutes in their respective positions will be described later in connection with FIGS. 11 and 12.

The respective chutes 232 and 234 are pivotally coupled to shaft 218 by respective lateral support brackets 248 and 250, both of which have longitudinal bores through which the shaft extends. Bracket 250 has a central recess 252 in which bracket 248 is disposed. The brackets are located axially with respect to shaft 218 by respective grub screws 254 and 256 which extend through the brackets generally radially of shaft 218 and engage in appropriately positioned circumferential grooves in the shaft.

Figure 5:
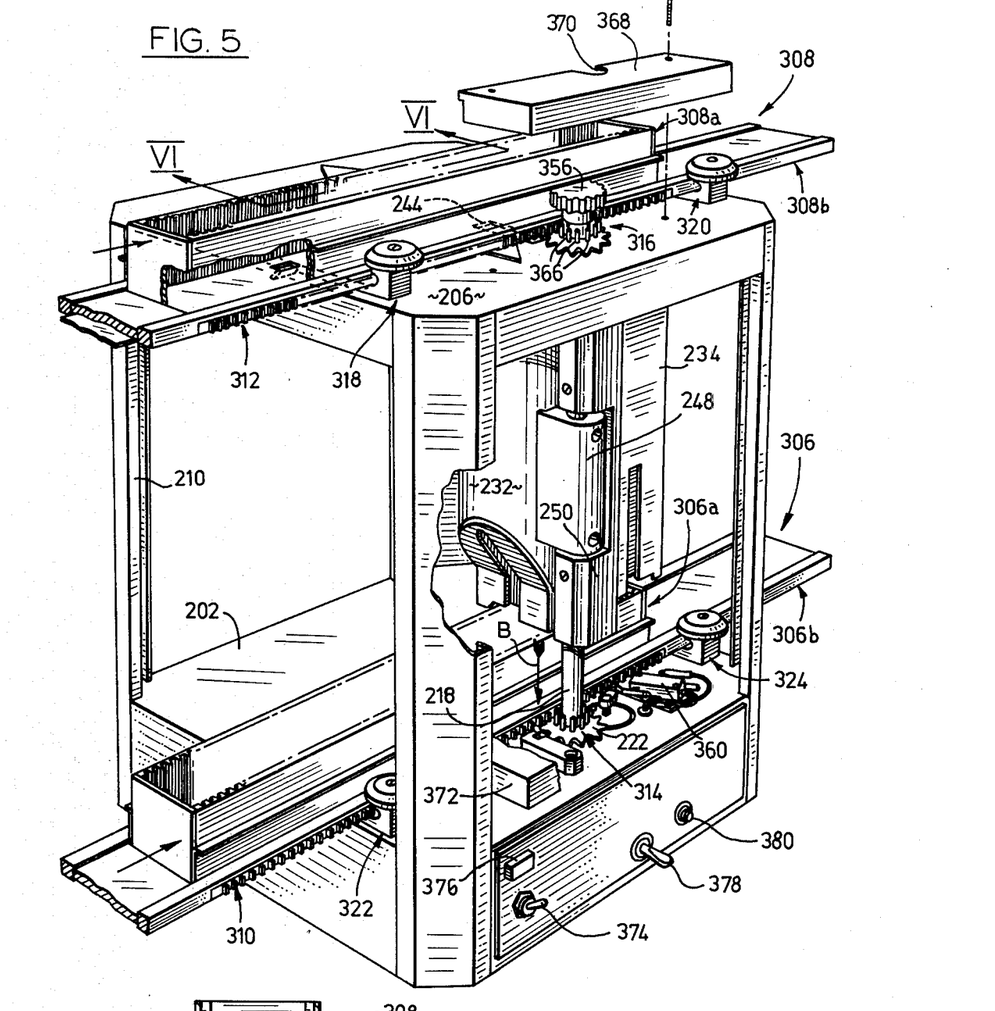
FIG. 5 is a view similar to FIG. 4 showing the apparatus in use in association with linear slide trays.

The apparatus shown in FIG. 4 is designed to operate not only with rotary slide trays but also with slide trays in which the slide receiving compartments of the tray are arranged in a linear configuration. FIG. 5 of the drawings shows the apparatus in use with such trays. However, before referring in detail to that view, it may be convenient to refer to FIGS. 6 to 8 in describing one of these linear trays. The trays are not conventional linear trays of the form used in slide projectors but are specially designed for use with the apparatus provided by the invention; they are not intended to be used as projection trays (although it is conceivable that they could be used with a specially built projector). In any event, referring primarily to FIG. 8, one of the trays is generally indicated at 258 in association with a carrier 260 designed to support the tray while it is being used in the slide reversing apparatus. Carrier 260 is designed to be interchangeable with different trays and normally there will be two of these carriers for each slide reversing apparatus. However, in another embodiment, the tray and carrier could be integrally combined as one unit.

Figure 8:
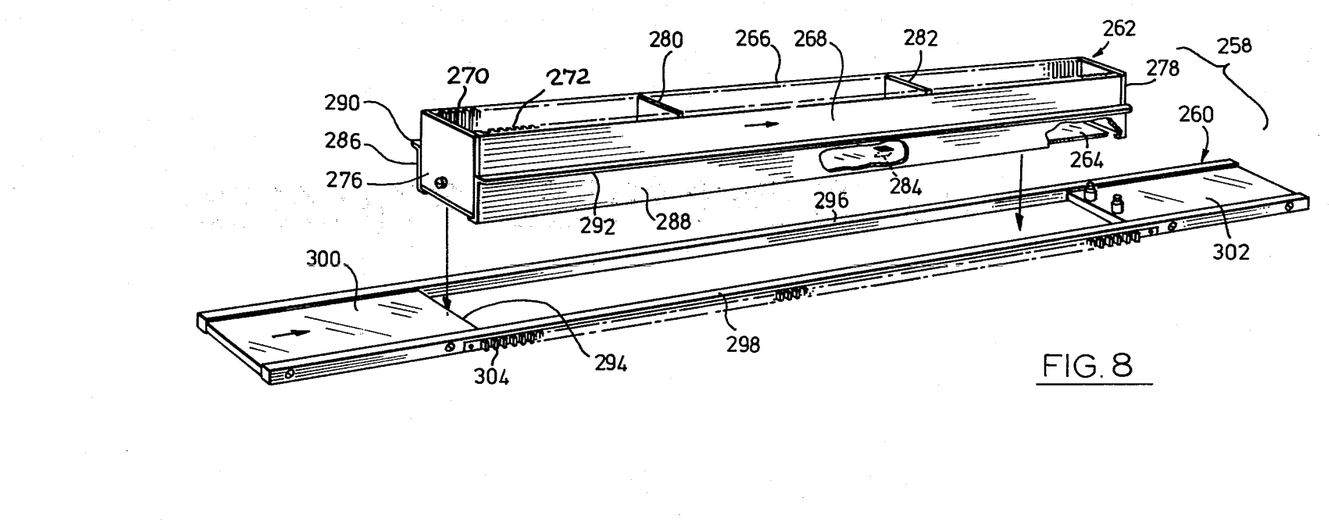
FIG. 8 is a partly exploded perspective view of one of the linear trays of FIG. 5 in association with a carrier.

Tray 258 is somewhat similar to the rotary trays described previously in that it comprises an upper tray portion 262 and the base member 264 which is slidable with respect to portion 262. The tray portion includes two parallel longitudinal side members 266 and 268, each having inner surfaces formed with parallel grooves which extend normal to the base member 264. Some of these grooves are visible at 270 and 272. The grooves 270 and 272 are aligned transversely of the tray and define the slide receiving compartments. A number of slides are shown in some of these compartments at 274 in FIG. 6. Tray portion 262 also includes transverse members 276 and 278 at the respective ends of the tray and intermediate transverse members 280 and 282. These transverse members are relatively thin and do not occupy compartments of the tray; they are provided solely for strength.

Base member 264 closes the lower ends of the compartments and is defined simply by a thin and flat metal sheet of narrow rectangular shape formed intermediate its ends with a depending tab portion 284, the purpose of which will be described later. Base member 264 is slidable longitudinally of the tray with respect to tray portion 262 so that, by causing intermittent rectilinear movement between the base member and the tray portion, the lower ends of the slide receiving compartments in the tray can be progressively exposed. Base member 264 is retained by respective Z-section members 286 and 288 which extend along the respective side members externally thereof and in which have respective lower limbs disposed below the tray portion and forming slides for base member 264. These members also have upper limbs which define respective laterally projecting flanges 290 and 292. These flanges serve to co-operate with carrier 260 for supporting the tray in the carrier. Thus, carrier 260 is in essence simply a narrow and elongate rectangular plate formed with a rectangular central opening 294 dimensioned to closely receive tray 258. The tray is fitted into recess 294 and the side flanges 290 and 292 on the tray supported in the carrier. This allows the tray to be carried by simply lifting the carrier although, when the tray and carrier are in use together in the slide reversing apparatus, the flanges 290 and 292 are not used and the tray portion 258 is disposed with its lower surface substantially even with the lower surface of carrier 260.

In this particular embodiment, carrier 260 simply comprises two straight metal bars 296 and 298 jointed by two end members 300 and 302 which space the bars and which are spaced from one another by extents appropriate to define a recess 294 of the required shape. Bar 298 is provided on its side edge with a straight-toothed rack 304, the purpose of which is to permit the tray assembly comprising the tray 258 and the carrier 260 to be indexed through the apparatus as will be described later.

Referring back to FIG. 5, two of these tray assemblies are indicated at 306 and 308 and are disposed in parallel positions on the body 202 and the platform 206 of the apparatus respectively. The trays of the respective assemblies are denoted 306a and 308a while the associated carriers are denoted 306b and 308b. The two tray assemblies are disposed directly adjacent the shaft 218 so that the racks of the respective tray carriers (denoted 310 and 312 respectively) can engage drive pinion means carried by shaft 318. The drive pinion means are indicated respectively at 314 and 316 and will be described later in connection with FIGS. 9 and 10. For present purposes, it is sufficient to note that, as shaft 318 is indexed angularly about its longitudinal axis, the two tray assemblies will be indexed stepwise in synchronism through the apparatus. The apparatus is designed to index the trays from left to right during normal operation of the apparatus, as viewed in FIG. 5.

Figure 7:
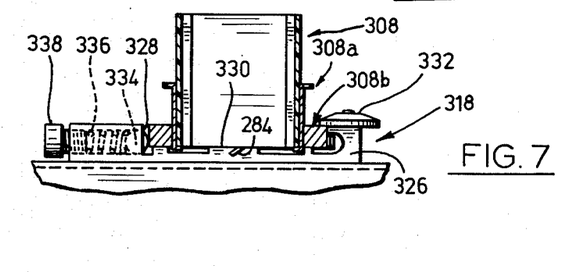
FIG. 7 is a sectional view on line VII—VII of FIG. 6.

Each tray assembly is guided in its movement through the apparatus by two guide assemblies which cooperate with the respective tray carriers. The guide assemblies for the upper tray are indicated at 318 and 320 and are disposed adjacent respectively opposite ends of platform 206. The guide assemblies for body 202 are indicated at 322 and 324 and are similarly disposed on body 202. The four guide assemblies are essentially the same and one of them will now be described as representative of all four. Thus, FIG. 7 shows the guide assembly 318 for the upper tray assembly. The assembly includes a body 326 shaped to define a recess 328 for receiving the lower portion of the tray assembly. The bottom of recess 328 is defined by a central guide surface 330 for contact with the underside of the tray. Body 326 is moulded in a hard plastic material so that guide surface 330 presents minimum resistance frictional. A rotatable guide roller 332 is provided at one side of recess 328 and has a lower surface arranged to engage the top surface of carrier 308b immediately above the rack 312 so as to in effect hold down that side of the carrier and ensure its proper engagement with the drive pinion means 316. At the opposite side of recess 328, a ball 334 bears against the side edge of carrier 308b opposite rack 312. Ball 334 is captive in a bore in body 326 and is biassed against the carrier by a spring 336 in the ball. A screw 338 bears against the outer end of spring 336 and is threaded into body 326 so that it can be turned to vary the biassing effect of the spring. This spring biassed ball arrangement is used to apply a light restraining force to the tray assembly to ensure its smooth advancement through the apparatus.

Figure 6:
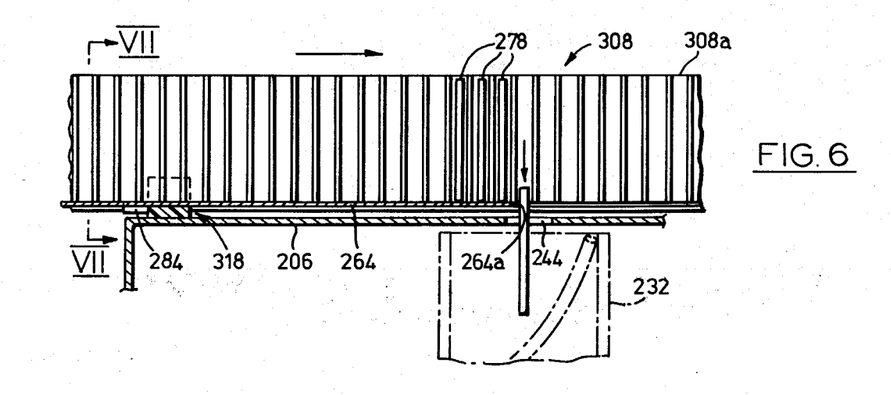
FIG. 6 is a sectional view on line VI—VI of FIG. 5.

FIG. 6 shows tray assembly 308 in position on platform 206 during a slide reversing operation. Part of the reversing chute 232 is indicated in ghost outline below the slot 244 in platform 206. It will be seen that the tab portion 284 which projects downwardly from the base member 264 of the tray assembly (see FIG. 8) abuts against guide assembly 318 so that the base member of the tray cannot move to the right in FIG. 6. Since the rack (312-FIG. 5) of tray assembly 308 is part of the carrier 308b and since the carrier engages only the tray portion of the assembly, only that portion will be advanced by the drive pinion means. The base member 264 of the tray will remain stationary as can clearly be seen in FIG. 6. As a result, the lower ends of the slide receiving compartments in the tray portion 308a will be progressively exposed as the tray portion is advanced through the apparatus. Slides in those compartments will accordingly be released in sequence and allowed to drop downwardly from the tray.

FIG. 6 illustrates the fact that the depending tab portion 284 of the tray base member is spaced from the leading end of that member (denoted 264a) by an extent such that edge 264a is disposed directly adjacent the slot 244 in platform 206. As a result, the slides leaving the tray will drop into and through slot 244 and into chute 323. Tray assembly 308 is initially fitted to the apparatus by sliding the assembly manually from left to right, below the wheel 332 of guide assembly 318 until the leading end of rack 312 engages the drive pinion means 316. At this time, the first compartment of tray 308a will be positioned directly above slot 244. Tray base member 264 is dimensioned so that this first compartment is always open as can be seen from FIG. 8. This compartment will not normally receive a slide so the next succeeding compartment will be the first one with a slide in position ready to drop into slot 244. The first compartment is not normally used because it corresponds with the "zero" position of a rotary slide tray which is also not normally used (as discussed above).

The lower tray assembly 306 is advanced through the apparatus in much the same way as the upper tray assembly except that its tray base member (264-FIG. 8) remains in the fully "closed" position at all times so that the lower ends of all the compartments which are to receive slides remain closed. Referring back to FIG. 4, this is achieved by providing an additional recess (denoted 340) in the body of guide assembly 322 so that the tab portion (284-FIG. 8) of the tray base member will not be restrained as the tray assembly advances through the apparatus.

Figure 9:
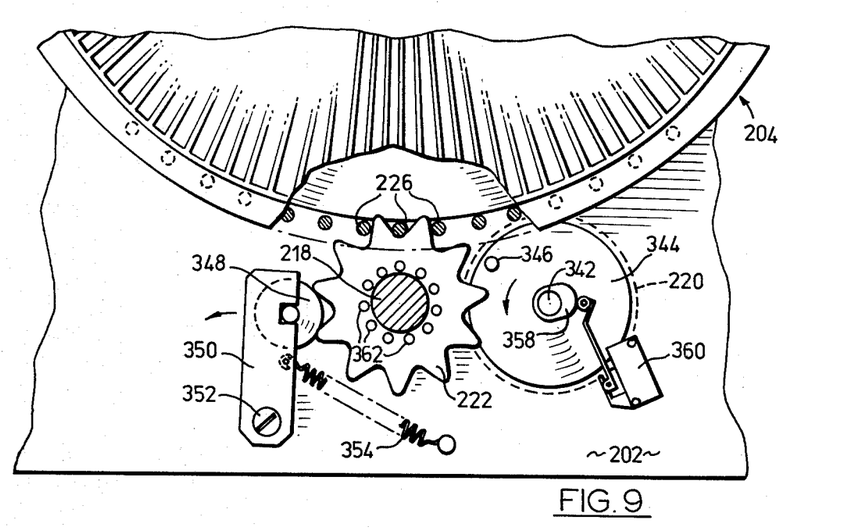
FIG. 9 is a detail plan view taken generally in the direction of arrow A in FIg. 4.
Figure 10:
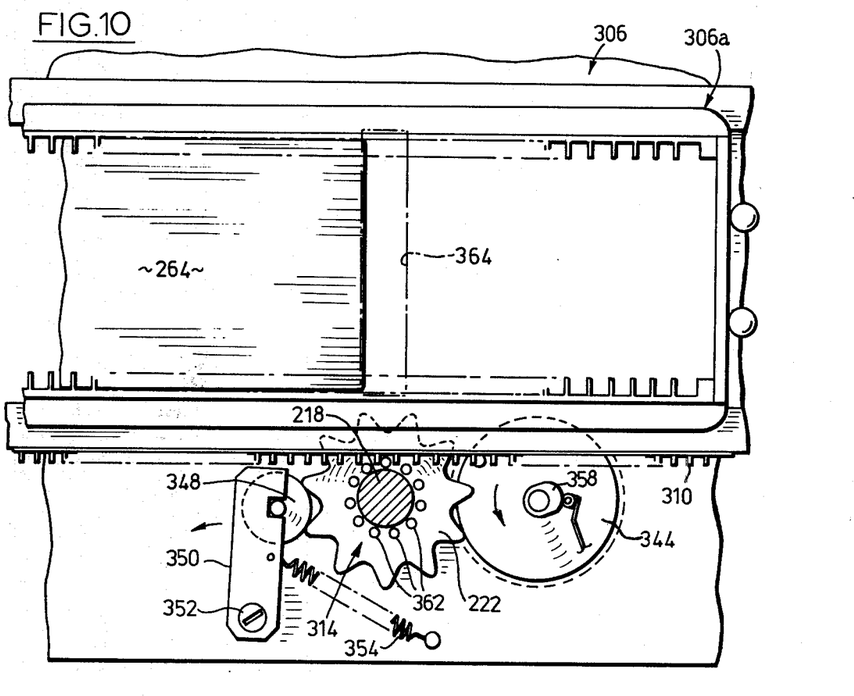
FIG. 10 is a view similar to FIG. 9 taken generally in the direction of arrow B in FIG. 5.

Reference will now be made to FIGS. 9 and 10 in describing the indexing of both rotary and linear slide trays through the apparatus provided by the invention. Referring first to FIG. 9, it will be remembered that gear wheel 222 engages the pins 226 at the bottom of slide tray 204 and is intermittently driven from drive motor 220. Motor 220 has a vertical output shaft 342 which projects upwardly through the top of body 220 and which is fitted with a disc 344 at its upper end. A pin 346 projects upwardly from disc 344 and the disc is positioned so that pin 346 will engage gear wheel 222 as the disc rotates. Motor 220 drives disc 344 continuously so that the pin 346 will engage gear wheel 222 once during each revolution of the motor and will turn the gear wheel 222 each time by an angular amount corresponding to the pitch of the teeth on gear wheel 222.

The extent to which the gear wheel turns is controlled by a spring biassed detent roller 348 which in runs in context with gear wheel 222 and which is dimensioned to locate between and engage each pair of adjacent teeth as the gear wheel rotates. Roller 348 is rotatably carried adjacent one end of an arm 350 which is pivotted to the body 202 of the apparatus by a screw indicated at 352. A spring 354 biasses arm 350 to maintain roller 348 in engagement with the gear wheel. Thus, at each revolution of motor 220, pin 346 will impact against one of the teeth of wheel 222 and turn the wheel, while roller 348 will ride over one of the teeth at the opposite side of the wheel and engage between the next two adjacent teeth, so as to define the position to which the wheel has moved.

Turning of wheel 222 does two things. Firstly, because the wheel is in engagement with the pins 226 of tray 204, the tray will turn through a predetermined angular amount. The extent of this turning movement is determined by appropriately dimensioning gear wheel 222 and is such as to advance the tray by an amount equal to the spacing between two adjacent slide-receiving compartments of the tray. Secondly, because gear wheel 222 is fixed to shaft 218, the shaft will also turn. Referring back to FIG. 4, the gear wheel 224 at the upper end of the shaft is the same as gear wheel 222 and engages the top tray 208. Accordingly, this tray will turn in synchronism with tray 204 through the same angular amount.

With continued reference to FIG. 4, it will be seen that shaft 218 also has a knurled knob 356 at its upper end. This permits shaft 218 to be turned manually so that the trays can be advanced manually if necessary. Referring back to FIG. 9, it will be seen that the motor output shaft 342 carries a cam 358 at its upper end and that a microswitch 360 runs in contact with the cam. Microswitch 360 is connected in an electrical supply circuit to motor 220 designed to prevent the motor stopping with pin 346 in engagement with gear wheel 220. This leaves shaft 218 free to be manually turned by knob 356 (FIG. 4) if necessary.

Reference will now be made to FIG. 10 which is a view similar to FIG. 9 but showing a linear slide tray assembly in place of tray 204. This assembly may in fact be the assembly shown at 306 in FIG. 5. As indicated previously, the rack 310 of the slide tray carrier 306b is engaged by drive pinion 314 associated with gear wheel 222. In this embodiment, the drive pinion means comprises an annular series of pins 362 which project upwardly from the upper surface of gear wheel 222 generally parallel to shaft 218. The gear wheels are dimensioned to engage between adjacent teeth of the rack 310 and the pins are arranged and positioned so that successive pins engage successive teeth of rack 310 as gear wheel 222 rotates. The teeth of rack 310 are designed to advance the tray assembly 306 by an incremental amount corresponding to the spacing between adjacent slide receiving compartments of the tray so that, at each step, successive compartments are advanced to the "zero" position (represented in ghost outline at 364) to receive a slide from the relevant chute.

Referring back particularly to FIG. 5, it will be seen that an annular series of pins 366 similar to the pins 362 is provided on gear wheel 224 and forms the drive pinion means engaging the rack 312 of the upper tray. These pins, of course, operate in the same manner as the pins 362. A cover which fits over the gear wheel 224 and pins 366 and over the portion of the rack engaged by the pins is shown in an exploded position at 368 in FIG. 5. The cover has a cut-out 370 for shaft 218 so that the knurled knob 356 can project above the cover. A similar cover is provided for the lower gear wheel 222 and part of that cover is shown at 372.

It will be appreciated from the foregoing that the tray driving arrangements provided in the apparatus will allow the apparatus to be used with two rotary slide trays, with two of the linear tray assemblies shown in FIG. 8, or with one linear tray assembly and one rotary tray. Thus, slides can be transferred between rotary trays, between linear trays or between one linear tray and one rotary tray. Whichever type of tray is in position either on platform 206 or on body 202, the tray will be advanced by an incremental amount corresponding to the spacing between adjacent slide receiving compartments each time the apparatus is operated. By using the reversing chute 232, the slides can be reversed in passing from the upper tray to the lower tray, or by using chute 234, the slides can simply be transferred from one tray to the other without reversing. The apparatus will operate automatically in any event. Referring to FIGS. 4 and 5, a main on/off switch is shown at 374 and has an associated indicator light 376. A "continuous on" switch is shown at 378 and will cause motor 220 to operate continuously when the switch is closed. A push button 380 is also provided for permitting the apparatus to be operated intermittently. If push button 380 is used, motor 220 will operate only while the push button is pressed. These controls, and microswitch 360, are all connected in the electrical power supply circuit for motor 220. The circuit does not form part of the present invention and will not therefore be described in detail.

Figure 11:
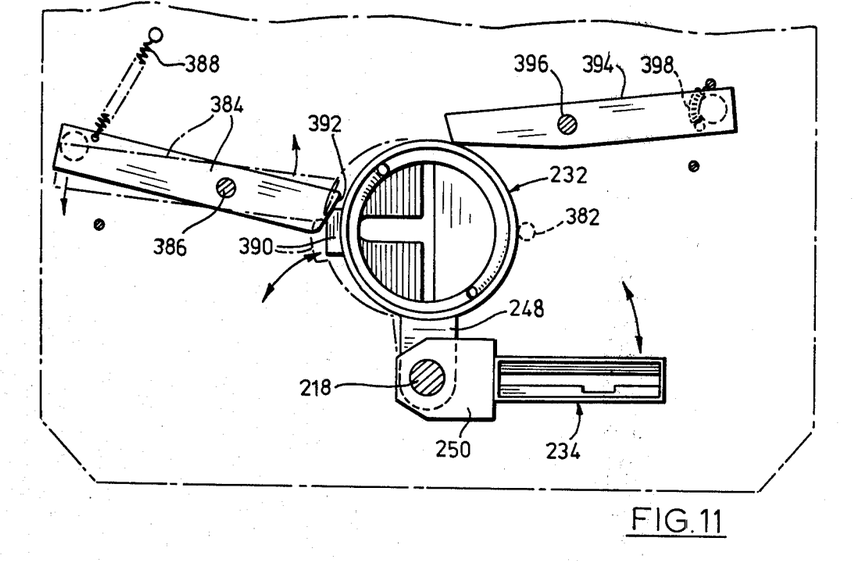
FIG. 11 is a sectional plan view taken generally on line XI—XI of FIG. 4 to show the chute means of the apparatus; and, FIG. 12 is a view similar to FIG. 11 showing the chute means and an alternative position.
Figure 12:
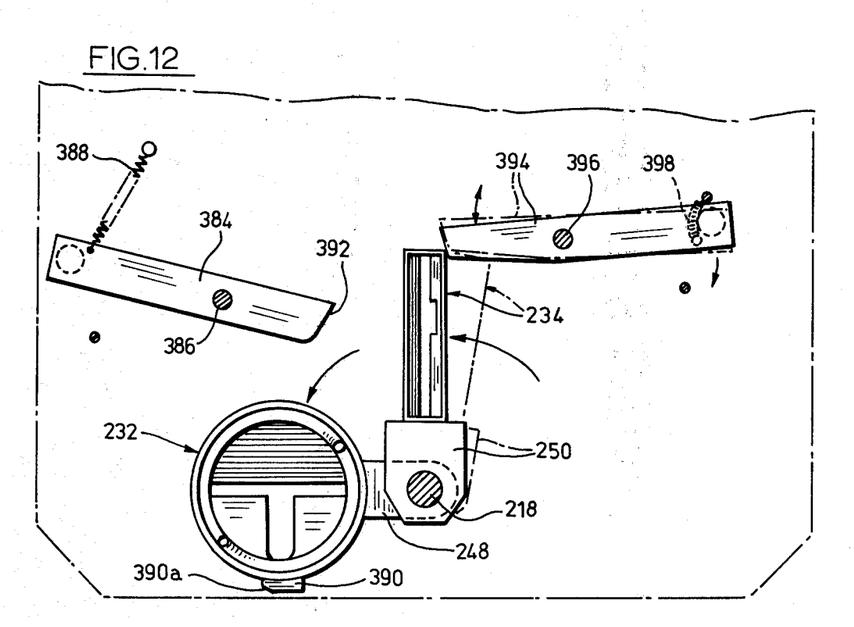

Reference will now be made to FIGS. 11 and 12 in describing the latching arrangements used for the chutes 232 and 234 of the apparatus. As discussed previously, the chutes are independently pivotted to shaft 218 so that either chute can be moved between an inoperative position clear of the lower slide tray, and an operative position above the tray. In FIG. 11, the reversing chute 232 is shown in its operative position, while in FIG. 12 the "straight through" chute is shown in its operative position. Referring first to FIG. 11, the reversing chute 232 is maintained in its operative positions by a stop 382 which depends from the underside of platform 206 for abutment with one side of the chute, and by a spring biassed latch member 384 which engages the opposite side of the chute. Member 384 is pivotted to the underside of platform 206 at a position indicated at 386 intermediate the ends of the member. The member is biassed in a clockwise direction about pivot pin 386 by a tension spring 388 at the outer end of the member, and the inner end of the member engages a projection 390 on the chute. As can best be seen from FIG. 12, projection 390 has a corner portion 390a which is chamfered to correspond with a chamfer 392 at the inner end of member 384. Thus, to return chute 232 to its inoperative position from the position shown in FIG. 11, latch member 384 is simply turned about its pivot 386 against the biassing effect of spring 388 to an extent sufficient to allow the latch member to clear projection 390 and the chute can then be swung back into its inoperative position.

The "straight through" chute 234 is retained in its operative position by a second latch member 394 which is pivotted to the underside of platform 206 by a pivot pin 396. A tension spring 398 biasses member 394 in the counter-clockwise direction about pin 396. When chute 234 is in its operative position, the outer end of member 394 engages one side of the chute. The chute is prevented from moving away from latch member 394 by abutment of the other chute 232 with a peripheral flange 206a (see FIG. 4) which depends from platform 206. Thus, the two chutes 232 and 234 are supported on shaft 218 by way of brackets 248 and 250 (see FIGS. 4 and 5) which interfit with one another so that the chutes cannot move to relative positions in which general vertical planes containing the two chutes are disposed at an angle less than 90° with respect to one another. Abutment of chute 232 with the flange 206a of platform 206 accordingly prevents further movement of chute 234 towards chute 232.

It should finally be noted that the preceeding description relates to particular embodiments of the invention and that many modifications are possible within the broad scope of the claims. For example, the particular materials referred to above for constructing the various components of the apparatus are not to be considered as limiting. While it may be particularly convenient to make the principal components of suitable plastic materials, components made of metals or other materials may be employed. The physical design of the components may also vary. For example, the slide reversing chutes need not be of cylindrical form as shown. In another embodiment, the reversing chute could be formed by a tubular member having a rectangular internal cross-section and shaped to define a spiral configuration. Also, the tapered portion at the end of the chute is not essential. It should further be noted that the chute need not turn the slides to 180° if the point of discharge of the slides into the lower tray is offset compared with the position at which the slides leave the upper tray.

I claim:

1. Slide handling apparatus comprising:
   means adapted to support a rotary slide tray for turning about a generally upright axis;
   means for indexing said tray about said axis;
   means adapted to permit the coupling with said indexing means of a second similar tray disposed in a position above and co-axially with the first-mentioned tray so that a said second tray can be indexed in synchronism with the first tray in use;
   each said tray including a rotatable tray portion defining a plurality of slide receiving compartments arranged in an annular configuration and having open upper and lower ends, and a stationary base member normally closing said lower ends of the compartments and having an opening through which slides can successively leave the compartments at a discharge position as the tray portion rotates in use;
   means for maintaining said base member of the second tray stationary while the associated tray portion is indexed by said coupling means;
   chute means disposed between the two trays and having an upper end disposed adjacent said discharge position for the second tray for receiving slides leaving said second tray, and a lower end arranged to deliver such slides into the first tray, said chute means defining a track down which the slides travel by gravity and which is shaped to turn each slide laterally in travelling along said track to an extent such that the slides enter said first tray in reverse orientation compared with their former orientation in the second tray; and,
   said indexing means being operable to index both trays through angular amounts sufficient to bring successive compartments of said first tray to a position below the lower end of said chute.

2. Apparatus as claimed in claim 1, wherein said support means includes: a platform disposed in an overhead position above said first tray and on which said second tray is rotatably disposed in use, said platform having an opening at said discharge position of the second tray for permitting slides leaving said tray to pass through the platform; and a plurality of support legs extending downwardly from said platform, said chute means being coupled to said support means; and wherein said means for maintaining the base member of the second tray stationary comprises a projection on said platform engagable by said base member of the second tray.

3. A device as claimed in claim 1, wherein said chute means comprises a generally cylindrical member adapted to be generally vertically positioned between said trays, and wherein said track is defined by two inwardly directed grooves extending along the inner surface of said cylindrical member at diametrally opposed positions, said grooves being arranged to receive respectively opposite side margins of slides passing through the member and being of helical shape for turning said slides laterally in travelling along said track.

4. A device as claimed in claim 3, wherein said chute means includes an outlet at its said lower end, said outlet defining a downwardly tapering slot through which slides leave said chute means in use, said slot being defined by convergent front and rear walls which terminate at an opening of a shape and size providing a minimum of clearance for a slide passing through said outlet.

5. Apparatus as claimed in claim 1, comprising: a conventional slide projector of the type which includes a projector body defining said means adapted to support a rotary slide tray for turning about a generally upright axis, a projection gate, means for indexing said tray about said axis to bring successive slides into a position to enter said gate and defining said tray indexing means of the apparatus, and an optical system by which slides in said gate can be illuminated and projected; and a slide reversing device adapted to be removably fitted to the projector body and including a platform arranged to be disposed in an overhead position above said projector body and on which said second tray is rotatably disposed in use, and a plurality of support legs extending downwardly from said platform for engagement with the projector body, said chute means being carried by the device, and said means for maintaining the base member of the second tray stationary comprising a projection on said platform engagable by said base member of the second tray.

6. Apparatus as claimed in claim 1, in the form of a self contained unit, wherein said tray indexing means comprises a drive motor forming part of said apparatus and having a rotary output shaft, driving means engagable by said first tray and adapted to index said tray about said axis, and means for intermittently transmitting the rotary motion of said output shaft to said driving means.

7. Slide handling apparatus comprising:
   a support body having an upper surface adapted to support a first slide tray of the type which includes a tray portion defining a plurality of slide receiving compartments and having open upper and lower ends, and a stationary base member normally closing said lower ends of the compartments and having an opening through which slides can successively leave the compartments at a discharge position as the tray moves with respect to the base member in use;

means disposed above said body surface in an overhead position and adapted to support a second similar tray in a generally horizontal disposition above a first tray on said body;

means for maintaining said base member of the second tray stationary while the associated tray portion is indexed to successively expose the lower ends of said slide receiving compartments;

chute means disposed between the two trays and having an upper end disposed adjacent said discharge position for the second tray for receiving slides leaving said tray, and a lower end arranged to deliver such slides into the first tray;

a drive shaft extending between the locations at which said trays are to be supported;

first and second tray driving means coupled to said shaft and adapted for engagement with the respective first and second trays so that, by intermittently turning said shaft with said trays in position in the apparatus, the trays will be indexed together to bring successive compartments of said second tray to said discharge position and successive compartments of said first tray into a position to receive trays from said chute means; and motor drive means disposed in said body and coupled to said shaft, said motor drive means being adapted to intermettently turn the shaft through a predetermined angular increment to index said trays.

8. Apparatus as claimed in claim 7, wherein said body upper surface and said second tray supporting means are adapted to support rotary slide tray disposed coaxially with respect to one another, wherein the tray portion of each said tray is rotatable about said axis with respect to said stationary base member of the tray.

9. Apparatus as claimed in claim 8, wherein each of said body upper surface and said second tray supporting means is adapted to alternatively support a linear slide tray and is provided with guide means for supporting a said linear tray for linear indexing by said tray drive means, each of said driving means being adapted to engage one of said linear trays so that indexing of said shaft about its longitudinal axis causes corresponding linear indexing of the trays.

10. Apparatus as claimed in claim 7, wherein said chute means comprises a first, reversing chute which defines a track down which the slides travel by gravity and which is shaped to turn each slide laterally in travelling along said track to an extent such that the slides enter said first tray in reverse orientation compared with their former orientation in the second tray; and a second, nonreversing chute, said chutes being pivotally coupled to said drive shaft so that each chute is movable between an inoperative position clear of said trays in use, and an operative position in which the chute is disposed between the trays for receiving slides from said second tray and delivering them to said first tray, whereby the first and second chutes may be used alternatively, and wherein the apparatus further comprises latching means adapted to retain either of said chutes in its operative position.

11. A slide reversing device for use in association with a slide projector of the type which includes a projector body adapted to support a rotary slide tray extending about a generally upright axis; a projection gate; means for indexing said tray about said axis to bring successive slides into a position to enter said gate; and an optical system by which slides in said gate can be illuminated and projected;

the device comprising:

means for coupling a second similar tray with said indexing means of the projector so that the second tray is indexed in synchronism with the first tray in use, being disposed in a position above and coaxially with the first-mentioned tray; each said tray including a rotatable tray portion defining a plurality of slide receiving compartments arranged in an annular configuration and having open upper and lower ends, and a stationary base member normally closing said lower ends of the compartments and having an opening through which slides can successively leave the compartments at a discharge position as the tray portion rotates in use;

means for maintaining said base member of the second tray stationary while the associated tray portion is indexed by said coupling means; and, chute means adapted to be supported above said projector body and having an upper end disposed adjacent said discharge position of the second tray for receiving slides leaving said second tray, and a lower end arranged to deliver such slides into the first tray, said chute means defining a track down which the slides travel by gravity and which is shaped to turn each slide laterally in travelling along said track to an extent such that the slides enter said first tray in reverse orientation compared with their former orientation in the second tray.

12. A device as claimed in claim 11, wherein said coupling means comprise a generally cylindrical member having a lower end adapted to be removably coupled to said first tray in non-rotatable fashion so as to extend upwardly from the projector body in use, and an upper end to which the tray portion of said second tray can be fitted in non-rotatable fashion.

13. A device as claimed in claim 12, wherein said tray portion of the first tray has an upright wall of cylindrical shape at the inner sides of said compartments, said inner wall being formed with at least one axially extending inward projection, and wherein the lower end of said coupling member is dimensioned to be slidably fitted inside said inner wall and includes at least one axially extending recess complimentary to said projection, whereby the coupling member is keyed to said tray portion when the member is fitted inside said inner wall.

14. A device as claimed in claim 11, further comprising a support adapted to be removably fitted to said projector body and including: a platform arranged to be disposed in an overhead position above said projector body and on which said second tray is rotatably disposed in use, said platform having a first opening through which said generally cylindrical member extends, and a second opening at said discharge position of the second tray for permitting slides leaving said tray to pass through the platform; and a plurality of support legs extending downwardly from said platform for engagement with the projector body; and wherein said chute means is carried by the support; and wherein said means for maintaining the base member of the second tray stationary comprises a projection on said platform engagable by said base member of the second tray.

15. A device as claimed in claim 11, wherein said chute means comprises a generally cylindrical member adapted to be generally vertically positioned between said trays, and wherein said track is defined by two inwardly directed grooves extending along the inner surface of said cylindrical member at diametrally opposed positions, said grooves being arranged to receive respectively opposite side margins of slides passing through the member and being of helical shape for turning said slides laterally in travelling along said track.

16. A device as claimed in claim 15, wherein said chute means includes an outlet at its said lower end, said outlet defining a downwardly tapering slot through which slides leave said chute means in use, said slot being defined by convergent front and rear walls which terminate at an opening of a shape and size providing a minimum of clearance for a slide passing through said outlet.

* * * * *